US012777236B2

(12) United States Patent
Kang et al.

(10) Patent No.: US 12,777,236 B2
(45) Date of Patent: Oct. 27, 2026

(54) CAMERA MODULE

(71) Applicant: SAMSUNG ELECTRO-MECHANICS CO., LTD., Suwon-si (KR)

(72) Inventors: Min Jeong Kang, Suwon-si (KR); Jae Hyuk Lee, Suwon-si (KR); Yu Mi Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 201 days.

(21) Appl. No.: 18/591,360

(22) Filed: Feb. 29, 2024

(65) Prior Publication Data

US 2025/0142187 A1 May 1, 2025

(30) Foreign Application Priority Data

Oct. 30, 2023 (KR) ........................ 10-2023-0146923

(51) Int. Cl.
*H04N 23/51* (2023.01)
*G03B 17/02* (2021.01)

(52) U.S. Cl.
CPC ............. *H04N 23/51* (2023.01); *G03B 17/02* (2013.01)

(58) Field of Classification Search
CPC ........ H04N 23/51; H04N 23/57; H04N 23/55; G03B 17/02; G03B 5/04; G03B 17/12
See application file for complete search history.

(56) References Cited

U.S. PATENT DOCUMENTS

2006/0209427 A1* 9/2006 Akiba .................... G02B 7/102 359/694
2022/0066290 A1 3/2022 Kim et al.
2022/0163089 A1 5/2022 Kim
2022/0210299 A1* 6/2022 Kwon .................... H04N 23/51
2022/0291475 A1* 9/2022 Kim ..................... G02B 13/009
2022/0350108 A1* 11/2022 Shin ....................... G03B 17/17
2023/0146805 A1* 5/2023 Paek ........................ G03B 5/00 359/557
2023/0209165 A1* 6/2023 Han ....................... G03B 30/00 348/374

FOREIGN PATENT DOCUMENTS

KR 10-2021-0009495 A 1/2021
KR 10-2021-0014301 A 2/2021
KR 10-2369442 B1 3/2022
KR 10-2022-0104133 A 7/2022

OTHER PUBLICATIONS

Korean Office Action issued on Mar. 25, 2026, in counterpart Korean Patent Application No. V 10-2024-0062147 (10 Pages in English, 8 Pages in Korean).

* cited by examiner

*Primary Examiner* — Timothy J Henn
(74) *Attorney, Agent, or Firm* — NSIP Law

(57) ABSTRACT

A camera module is provided. The camera module includes a carrier in which a lens barrel is disposed, the carrier configured to move in an optical axis direction, a frame at least partially disposed inside the carrier, a housing which accommodates the carrier, and a buffer member, wherein the frame includes a coupling portion that is exposed to an external area of the carrier, and the buffer member is configured to be coupled to the coupling portion, and a side of the buffer member is disposed to be closer to an internal surface of the housing than a side of the carrier.

20 Claims, 17 Drawing Sheets

I-I'

CAMERA MODULE

CROSS-REFERENCE TO RELATED APPLICATIONS

This application claims the benefit under 35 USC § 119 (a) of Korean Patent Application No. 10-2023-0146923 filed on Oct. 30, 2023, in the Korean Intellectual Property Office, the entire disclosure of which is incorporated herein by reference for all purposes.

BACKGROUND

1. Field

The following description relates to a camera module.

2. Description of Related Art

Camera modules may include a carrier that accommodates a lens module. The lens module is configured to be movable inside the camera module to enable focus adjustment of the camera module. In an example, the lens module may move in an optical axis direction within a housing of the camera module by the carrier. Typically, movement of carriers may be controlled by a camera module. However, movement of the carrier due to external shocks (for example, when a user quickly walks or runs while holding a mobile terminal equipped with a camera module) is not controlled by the camera module, thereby causing collisions and collision noise between the carrier and other members of the camera module.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a camera module including a carrier configured to move in an optical axis direction; a frame at least partially disposed inside the carrier; a housing which accommodates the carrier; and a buffer member, wherein the frame comprises a coupling portion that is exposed to an external area of the carrier, and wherein the buffer member is configured to be coupled to the coupling portion, and a side of the buffer member is disposed to be closer to an internal surface of the housing than a side of the carrier.

The carrier may be configured to hold a lens barrel.

The camera module may include a driving unit configured to move the carrier in the optical axis direction, wherein the driving unit may be disposed on a first side of the carrier, and the buffer member may be disposed opposite to the first side with respect to an optical axis.

Each of the coupling portion and the buffer member may be arranged in plural.

A first subset of the plurality of buffer members and a second subset of the plurality of buffer members may be arranged on opposite sides of the frame with respect to an axis, perpendicular to the optical axis.

Each of the coupling portion and the buffer member may be arranged in plural, the carrier may include a first side, a second side disposed to oppose the first side, a third side that connects the first side to the second side, and a fourth side that is disposed to oppose the third side, and the plurality of buffer members may include buffer members that are arranged on the third side of the carrier and the fourth side of the carrier.

The buffer member is disposed in plural, and the plurality of buffer members may be arranged on opposite sides of the housing, with an edge of the housing and a virtual straight line extending the optical axis therebetween.

The camera module may include a shield can configured to cover the housing, wherein an upper surface of the buffer member may be disposed to be closer to the shield can than to an upper surface of the carrier.

The housing may include a step portion that protrudes from the internal surface of the housing toward an internal area of the housing, and a lower surface of the buffer member may be disposed to face the step portion in the optical axis direction.

The coupling portion may include a coupling recess and a support portion, and the support portion may be disposed outside of the coupling recess with respect to the optical axis.

A first portion of the buffer member may be disposed in the coupling recess, and a second portion of the buffer member surrounds the support portion.

The support portion may include a first support portion and a second support portion, and the first support portion and the second support portion may face each other and may be spaced apart from each other in opposite directions.

The buffer member may include a first buffer portion, a second buffer portion, and a connection portion disposed between the first buffer portion and the second buffer portion.

The coupling portion may include a coupling recess and a support portion, and the connection portion may be fitted into the coupling recess.

The support portion may be disposed between the first buffer portion and the second buffer portion.

In a general aspect, a camera module includes a housing; a carrier disposed within the housing, and configured to move in an optical axis direction; and a frame coupled to an internal area of the carrier, wherein the carrier exposes a portion of the frame to an external area of the carrier, and a buffer member is coupled to the portion of the frame that is exposed to the external area of the carrier.

The carrier may be configured to move a lens barrel in the optical axis direction. A side of the buffer member may face an internal surface of the housing.

A coupling portion of the frame to which the buffer member is coupled may be disposed in the portion of the frame that is exposed to the external area of the carrier.

Other features and aspects will be apparent from the following detailed description, the drawings, and the claims.

Figure 1:
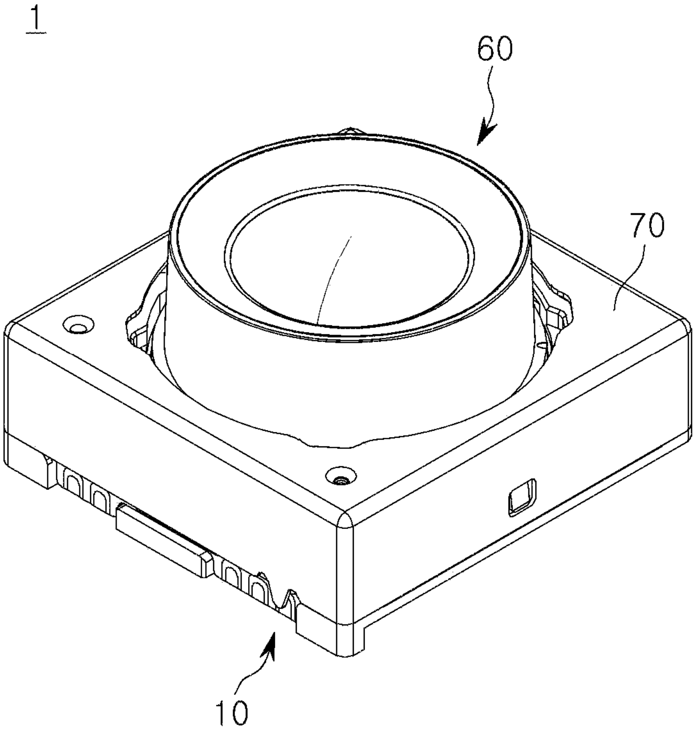
FIG. 1 illustrates a perspective view of an example camera module, in accordance with one or more embodiments.

Throughout the drawings and the detailed description, unless otherwise described, the same reference numerals refer to the same elements. The drawings may not be to scale, and the relative size, proportions, and depiction of elements in the drawings may be exaggerated for clarity, illustration, and convenience.

DETAILED DESCRIPTION

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

For the description, an object side may be referred to as a front or upper side and an image side may be referred to as a rear or lower side. In addition, based on an optical axis, a direction away in a direction, perpendicular to the optical axis, may be referred to as an outside and a direction toward in a direction, perpendicular to the optical axis, may be referred to as an inner side.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

One or more examples may be configured to reduce noise caused by movement of a carrier within the camera module.

One or more examples may provide a camera module configured to reduce collision noise of a carrier and failure and damage of the camera module due to carrier collision.

Figure 2:
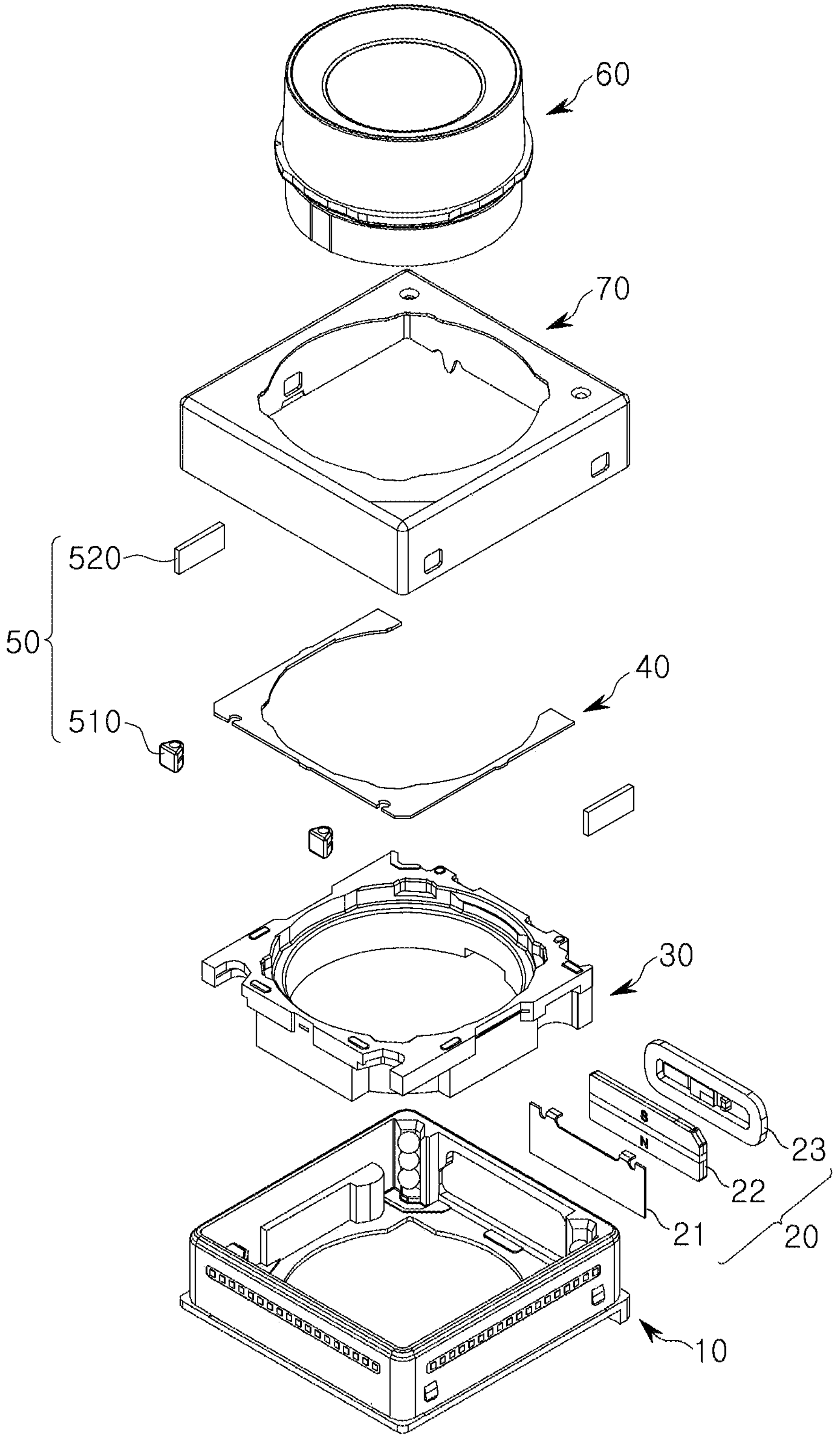
FIG. 2 illustrates an exploded perspective view of an example camera module, in accordance with one or more embodiments.
Figure 3:
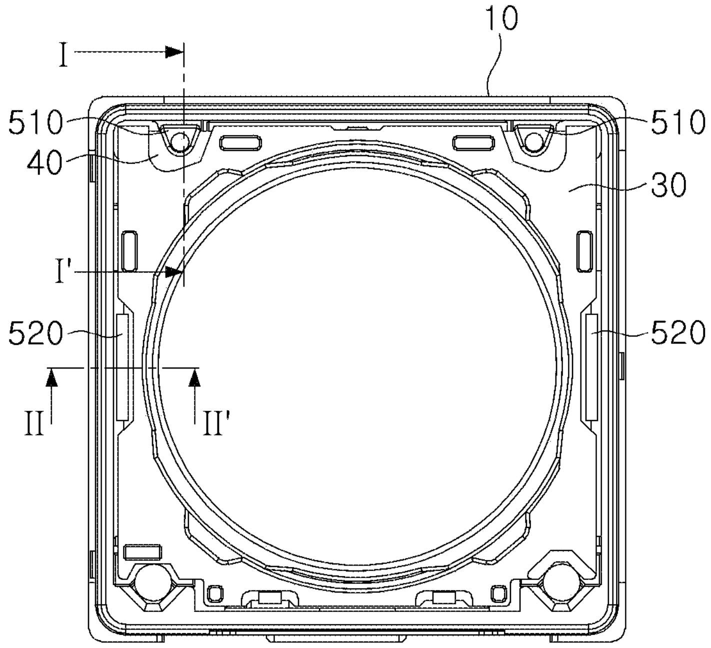
FIG. 3 illustrates a plan view of a portion of an example camera module, in accordance with one or more embodiments.

FIG. 1 illustrates a perspective view of an example camera module, in accordance with one or more embodiments, FIG. 2 illustrates an exploded perspective diagram of an example camera module, in accordance with one or more embodiments, and FIG. 3 illustrates a plan view of a portion of an example camera module, in accordance with one or more embodiments.

A camera module 1, in accordance with one or more embodiments, may include a housing 10, a driving unit 20, a carrier 30, a frame 40, a buffer member 50, and a lens barrel 60. However, the components of the camera module 1 are not limited thereto, but may include other components, such as, but not limited to, a substrate and an image sensor. The carrier 30 is disposed in the housing 10, and the lens barrel 60 may be disposed in the carrier 30. In the carrier 30, the buffer member 50 may be disposed to reduce an impact between the housing 10 and the carrier 30. A first portion of the driving unit 20 may be disposed in the carrier 30, and a second portion of the driving unit 20 may be disposed in the housing 10. The first portion of the driving unit 20 and the second portion of the driving unit 20 may be disposed to face each other. For example, the driving unit 20 includes a yoke 21, a magnet 22, and a coil 23. The magnet 22 may be disposed in the carrier 30, and the coil 23 may be disposed in the housing 10.

A shield can 70 may be configured to cover the housing 10 to which other components may be coupled, to surround the housing 10.

Figure 4:
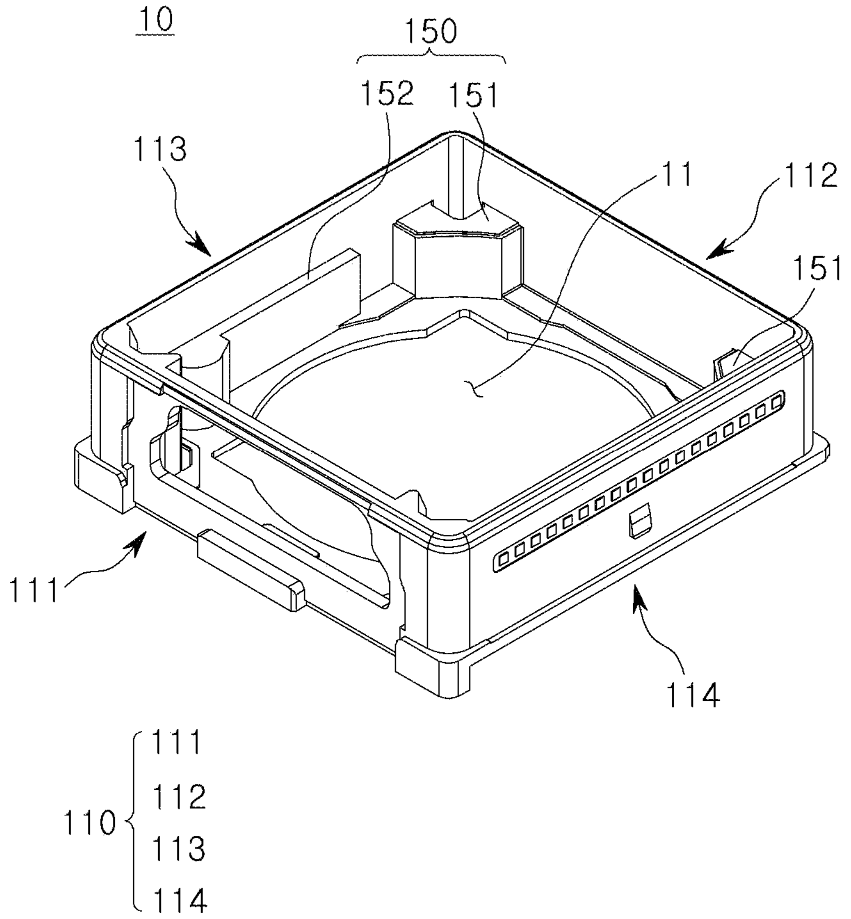
FIG. 4 illustrates a perspective view of a housing of an example camera module, in accordance with one or more embodiments.

FIG. 4 is a perspective view illustrating the housing 10 of the camera module 1, in accordance with one or more embodiments.

The housing 10 may accommodate the carrier 30. That is, the carrier 30 may be disposed in the internal space of the housing 10. An opening 11 having a predetermined size may be disposed in a lower surface of the housing 10. Light may be incident on an image sensor through the opening 11.

When viewed from the top of the housing 10, the housing 10 may have a quadrangular shape. The housing 10 may include a sidewall 110. The sidewall 110 of the housing 10 may include four sidewalls. The sidewall 110 of the housing 10 may include a first sidewall 111, a second sidewall 112 disposed to oppose the first sidewall 111, a third sidewall 113 connecting the first sidewall 111 to the second sidewall 112, and a fourth sidewall 114 connecting the first sidewall 111 to the second sidewall 112 and disposed to oppose the third sidewall 113.

The carrier 30 may be disposed in the space formed by the sidewall 110 of the housing 10. The space side formed by the sidewall of the housing 10 may be the inside of the housing 10. The carrier 30 may be disposed inside the housing 10, and the carrier 30 may be disposed to be spaced apart from the surfaces of the sidewalls of the housing 10.

A portion of the driving unit 20 may be disposed in any one of the sidewalls 110 of the housing 10. The driving unit 20 may include the yoke 21, the magnet 22, and the coil 23. The driving unit 20 may be an actuator that generates a driving force through an electromagnetic interaction of the magnet 22 and the coil 23. If the yoke 21 is disposed to be adjacent to the carrier 30, the magnet 22 may be disposed to be adjacent to the housing 10. Conversely, if the yoke 21 is disposed to be adjacent to the housing 10, the magnet 22 may be disposed to be adjacent to the carrier 30. Therefore, by the magnet 22 and the yoke 21, attraction may act on the carrier 30 to be pulled to one side of the housing 10 inside the housing 10.

In an example, a step portion 150 may be disposed inside the housing 10. The step portion 150 may be in contact with the buffer member 50 to be described below. The step portion 150 may protrude from a lower surface of the housing 10 in the optical axis direction. Additionally, the step portion 150 may be connected to the sidewall of the housing 10. That is, the step portion 150 may protrude from the internal surface of the sidewall 110 of the housing 10 to the inside of the housing 10.

In an example, a height of the step portion 150 may be lower than a height of the sidewall 110 of the housing 10. That is, an upper surface of the step portion 150 may be disposed in a position lower than the upper surface of the sidewall 110 of the housing 10. The step portion 150 may be disposed on the sidewall in which a portion of the driving unit 20 is not disposed, among the sidewalls 110 of the housing 10. For example, when a portion of the driving unit 20 is disposed on the first sidewall 111, the step portion 150 may be disposed on at least one of the second sidewall 112, the third sidewall 113 and the fourth sidewall 114.

The step portion 150 may include a first step portion 151 and a second step portion 152.

The first step portion 151 may be disposed in an inner corner area of the housing 10. That is, the first step portion 151 may be formed to protrude from the sidewall 110 to the inside of the housing 10. For example, when a portion of the driving unit 20 is disposed in the first sidewall 111, the first step portion 151 may be disposed in the corner area formed by the second sidewall 112 and the third sidewall 113. The first step portion 151 may be disposed in a corner area formed by the second sidewall 112 and the fourth sidewall 114.

The second step portion 152 may be formed to protrude from the internal surface of the sidewall to the inside of the housing 10. The second step portion 152 may be formed to protrude from an internal surface of another sidewall, except the sidewall on which a portion of the driving unit 20 is disposed, to the inside of the housing 10. For example, when a portion of the driving unit 20 is disposed on the first sidewall 111, the second step portion 152 may be formed to protrude from an inner surface of at least one of the second sidewall 112, the third sidewall 113, and the fourth sidewall 114 to the inside of the housing 10.

Figure 5:
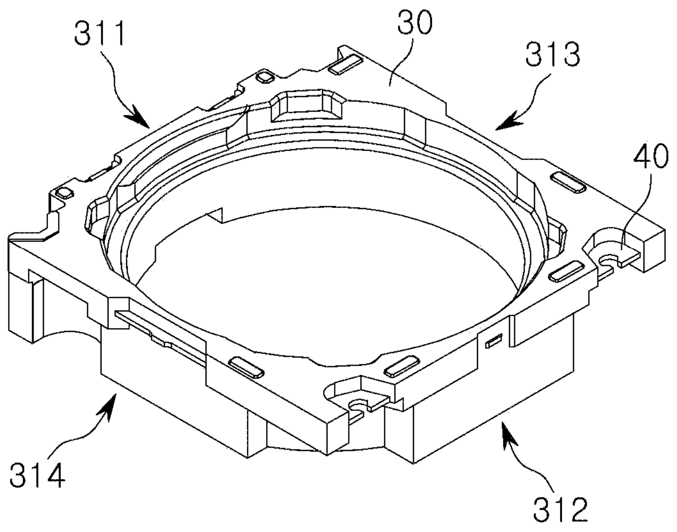
FIG. 5 illustrates a perspective view of a carrier to which a frame of an example camera module is coupled, in accordance with one or more embodiments.
Figure 6:
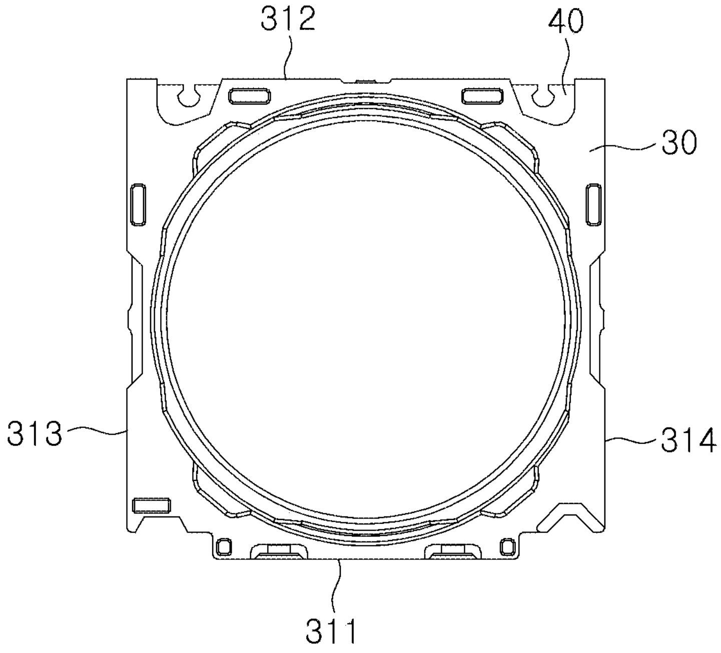
FIG. 6 illustrates a plan view of a carrier to which a frame of an example camera module is coupled, in accordance with one or more embodiments.

FIG. 5 is a perspective diagram illustrating the carrier to which the frame of the camera module is coupled, in accordance with one or more embodiments, and FIG. 6 is a plan view illustrating the carrier to which the frame of the camera module is coupled, in accordance with one or more embodiments.

The carrier 30 may be disposed inside the housing 10. The lens barrel 60 may be arranged inside the carrier 30. The carrier 30 may be disposed inside the housing 10 and may be moved in the optical axis direction by the driving unit 20. The carrier 30 may be disposed to be spaced apart from the internal surface of the sidewall 110 of the housing 10.

When viewed from above, the carrier 30 may have a square shape. That is, the carrier 30 may include first to fourth sides 311, 312, 313, and 314 respectively.

The first side 311 may be disposed to oppose the second side 312. The third side 313 may connect the first side 311 to the second side 312. The fourth side 314 may connect the first side 311 to the second side 312 and may be the opposite side of the third side 313.

A portion of the driving unit 20 and the buffer member 50 may be disposed on at least one side of the sides 311, 312, 313, and 314 of the carrier 30. In this example, the buffer member 50 may be disposed on the side in which a portion of the driving unit 20 is not disposed, among the sides 311, 312, 313, and 314 of the carrier 30. For example, when a portion of the driving unit 20 is disposed on the first side 311, the buffer member 50 may be disposed on any one of the second side 312, the third side 313, and the fourth side 314 of the carrier 30.

The frame 40 may be insertedly disposed in the carrier 30. The frame 40 may be inserted into the carrier 30. That is, the carrier 30 may be manufactured by an insert injection method, and the frame 40 may be placed in a mold and an injection-molded product may be manufactured with the frame 40 placed in the mold by the insert injection method. Thus, at least a portion of the frame 40 may be disposed inside the carrier 30.

Figure 7:
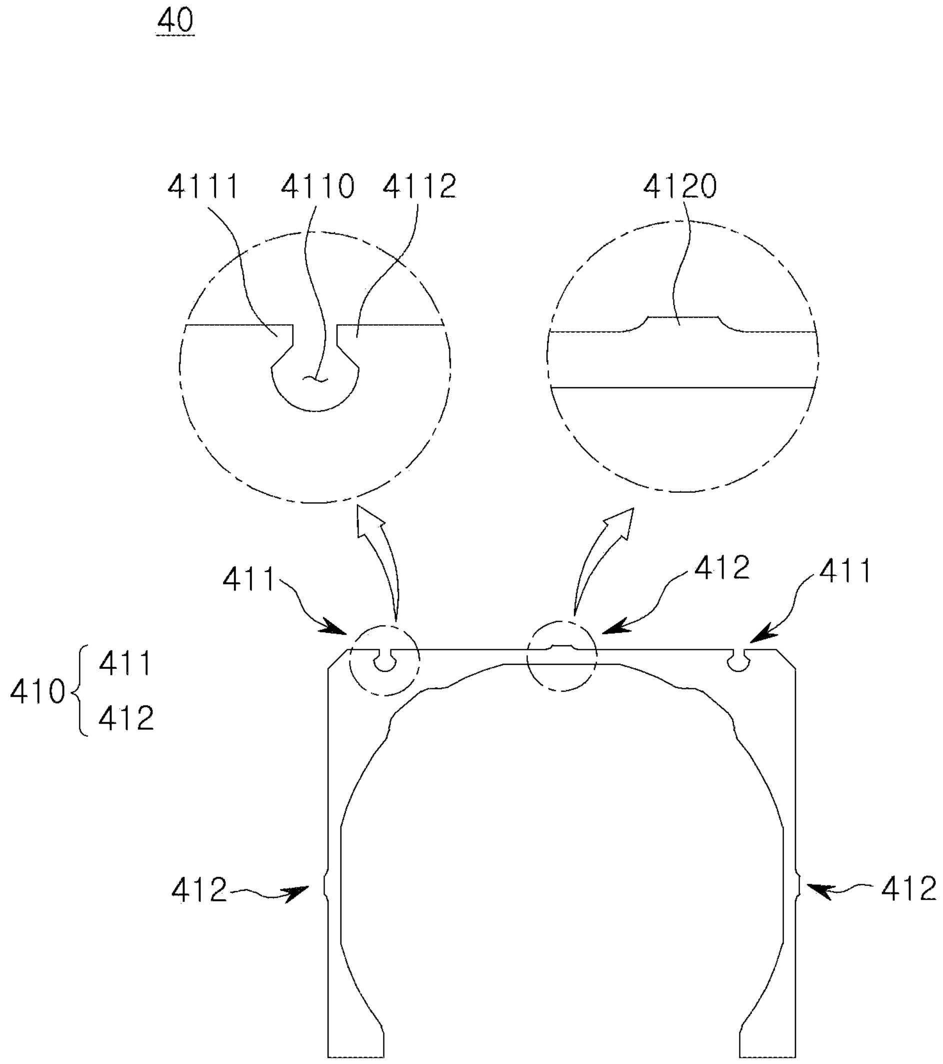
FIG. 7 illustrates a plan view of a frame of an example camera module, in accordance with one or more embodiments.

FIG. 7 is a plan view illustrating the frame of the example camera module, in accordance with one or more embodiments.

The frame 40 may be inserted into the carrier 30. In an example, the frame 40 may be a metal material. To minimize a magnetic field interference with the driving unit 20, in an example, the frame 40 may be formed of a non-magnetic metal (e.g., stainless steel).

A portion of the frame 40 may be exposed to the outside of the carrier 30. In an example, the portion of the frame 40 exposed to the outside of the carrier 30 may be a coupling portion 410. The buffer member 50 may be coupled to the coupling portion 410.

In an example, the coupling portion 410 may be provided in plural. If a portion of the driving unit 20 is disposed on the first side 311 of the carrier 30, the coupling portion 410 may be disposed on any one of the second side 312, the third side 313, and the fourth side 314. That is, the coupling portion 410 may be disposed in an area other than the area in which the driving unit is disposed based on the carrier 30.

The coupling portion 410 may include a first coupling portion 411 and a second coupling portion 412. Each of the first coupling portion 411 and the second coupling portion 412 may be provided in plural. A first buffer member 510 to be described below may be disposed in the first coupling portion 411, and a second buffer member 520 to be described below may be disposed in the second coupling portion 412.

When viewed from above the frame 40, the first coupling portion 411 may be formed to be lead from the outside of the frame 40 to the inside of the frame 40. That is, the first coupling portion 411 may include a coupling recess 4110, a first support portion 4111, and a second support portion 4112 led into the frame from the outside of the frame 40.

The coupling recess 4110 may be a recess formed to be led inwardly from the outside of the frame 40. The coupling recess 4110 may be disposed between the first support portion 4111 and the second support portion 4112.

The first support portion 4111 and the second support portion 4112 may have a protrusion shape. The first support portion 4111 and the second support portion 4112 may be disposed to face each other. The ends of the first support portion 4111 and the second support portion 4112 may be spaced apart from each other. That is, the coupling recess 4110 may be a recess formed to be led to the inside of the frame 40 between the ends of the first support portion 4111 and the second support portion 4112.

A portion of the first buffer member 510 to be described below may be disposed in the coupling recess 4110, and the first support portion 4111 and the second support portion 4112 may be disposed in a portion of the first buffer member 510 to be described below. That is, a portion of the first buffer member 510 may be inserted into the coupling recess 4110 and another portion thereof may be disposed to surround the first support portion 4111 and the second support portion 4112.

The second coupling portion 412 may protrude from the side of the frame 40 to the outside of the frame 40. That is, the second coupling portion 412 may include a protrusion 4120 that protrudes from the side of the frame. The second buffer member 520 to be described below may be coupled to the second coupling portion 412. Specifically, the second coupling portion 412 may be inserted into the second buffer member 520 so that the second buffer member 520 and the second coupling portion 412 may be fitted with each other. In this example, the binding of the second buffer member 520 and the second coupling portion 412 may be solidified by the protrusion 4120 of the second coupling portion 412.

Figure 8:
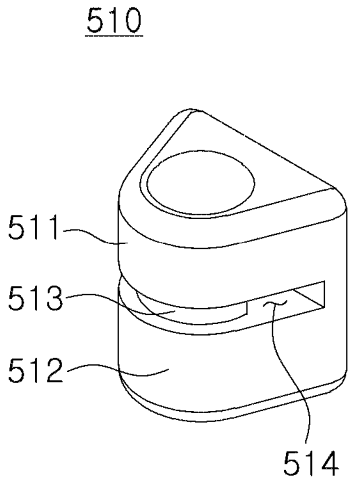
FIG. 8 illustrates a perspective view of a first buffer member of an example camera module, in accordance with one or more embodiments.
Figure 9:
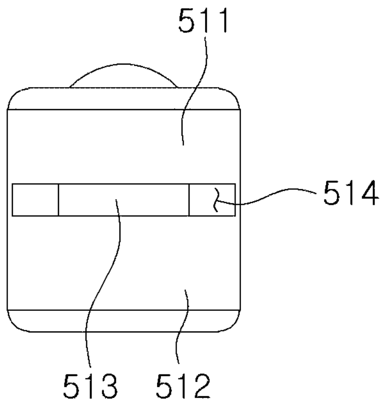
FIG. 9 illustrates a front view of a first buffer member of an example camera module, in accordance with one or more embodiments.
Figure 10:
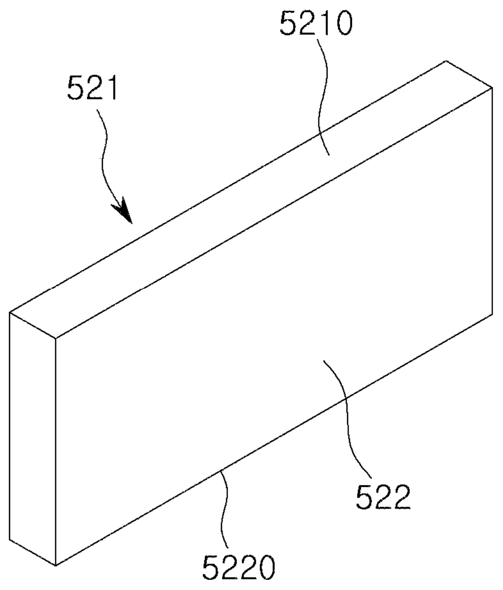
FIG. 10 illustrates a perspective view of a second buffer member of an example camera module, in accordance with one or more embodiments.

FIG. 8 is a perspective view illustrating the first buffer member of the camera module, in accordance with one or more embodiments, FIG. 9 is a plan view illustrating the first buffer member of the camera module, in accordance with one or more embodiments, and FIG. 10 is a perspective view illustrating the second buffer member of the camera module, in accordance with one or more embodiments.

In an example, the buffer member 50 may be elastic. That is, the buffer member 50 may be formed of a material that may absorb an impact. For example, the buffer member 50 may be formed of materials, such as, but not limited to, urethane, foamed resin, natural rubber, and synthetic rubber.

The first buffer member 510 may include a first buffer portion 511, a second buffer portion 512, and a connection portion 513. The connection portion 513 may be disposed between the first buffer portion 511 and the second buffer portion 512 to connect the first buffer portion 511 and the second buffer portion 512. That is, a lower surface of the first buffer portion 511 and an upper surface of the second buffer portion 512 may be spaced apart from each other by the connection portion 513. In addition, the connection portion 513 may have a cylindrical shape. A cross-sectional area of the connection portion 513 may be smaller than a cross-sectional area of the first buffer portion 511 or the second buffer portion 512. Due to this structure, a separation space 514 may be formed between the first buffer portion 511, the second buffer portion 512, and the connection portion 513.

The first support portion 4111 and the second support portion 4112 of the first coupling portion 411 described above may be disposed in the separation space 514, and the connection portion 513 of the aforementioned first coupling portion 411 may be disposed in the coupling recess 4110 of the first coupling portion 411 described above. In this case, a side of the first buffer member 510 disposed on the opposite side of the separation space 514 may face an inner surface of the housing 10.

The second buffer member 520 may have a flat plate shape. The second coupling portion 412 of the frame 40 described above may be inserted into a first side surface 521 of the second buffer member 520. That is, the second coupling portion 412 of the frame 40 may be inserted into the second buffer member 520 through the first side surface 521 of the second buffer member 520 and fitted and coupled to the second buffer member 520. In this case, the second side surface 522 of the second buffer member 520 may face the side wall 110 of the housing 10. A length of the second buffer member 520 measured in a longitudinal direction of the side wall of the housing 10 based on the upper surface 5210 of the second buffer member 520 may be formed to be longer than a length of the first buffer member 510.

Figure 11:
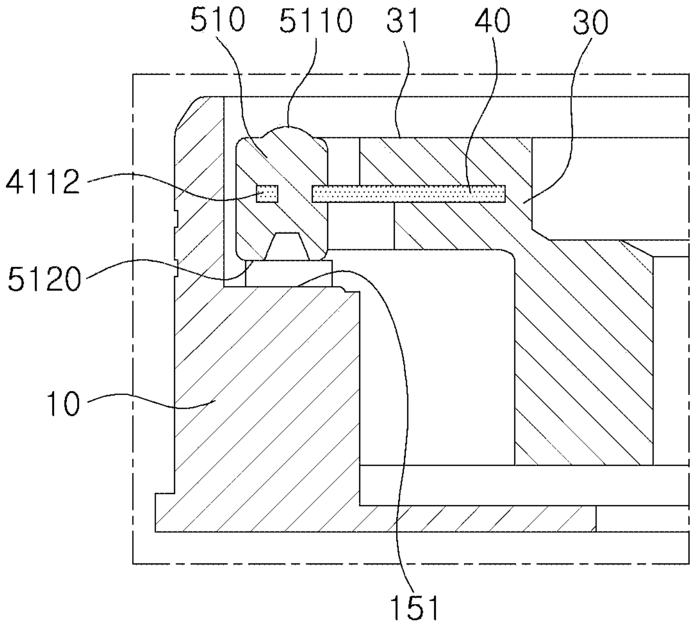
FIG. 11 illustrates a cross-sectional view taken along line I-I' of FIG. 3.
Figure 12:
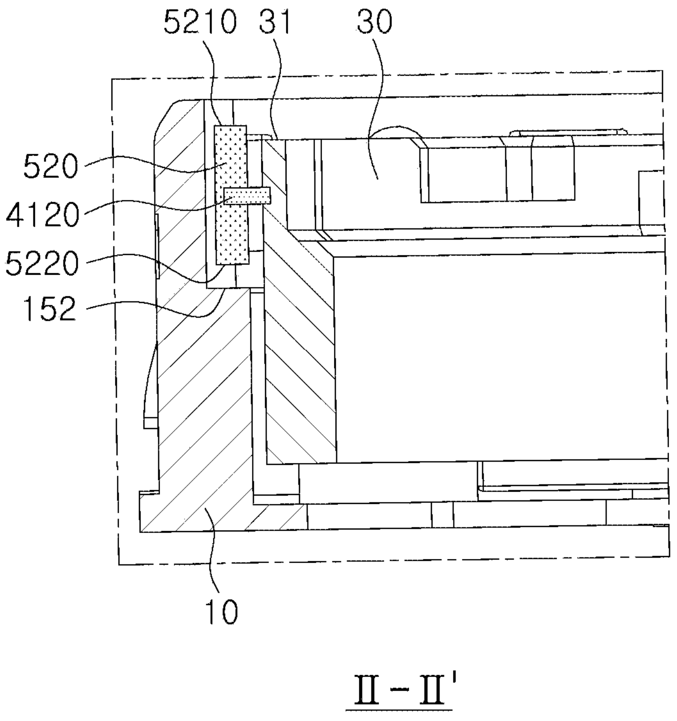
FIG. 12 illustrates a cross-sectional view taken along line II-II' of FIG. 3.

FIG. 11 illustrates a cross-section taken along line I-I' of FIG. 3, and FIG. 12 illustrates a cross-section taken along line II-II' of FIG. 3. The arrangement structure of the buffer member is described with reference to FIGS. 11 and 12.

Referring to FIG. 11, the carrier 30 and the lens barrel 60 are disposed within the housing 10, and the frame 40 is inserted into the carrier 30. In addition, the first buffer member 510 is disposed in the first coupling portion 411 of the frame 40.

An upper surface 5110 of the first buffer member 510 may be disposed to be higher than an upper surface 31 of the carrier 30. That is, the upper surface 5110 of the first buffer member 510 may be disposed closer to the shield can 70 than the upper surface 31 of the carrier 30, and thus, when an upward movement of the carrier 30 in the optical axis direction exceeds a predetermined range, the upper surface 5110 of the first buffer member 510 may first come into contact with the shield can 70 before the upper surface 31 of the carrier 30, thereby reducing impacts caused by movement of the carrier 30 in the optical axis direction.

A lower surface 5120 of the first buffer member 510 may be disposed to face the first step portion 151 of the carrier 30. When the carrier 30 is lowered by the driving unit 20 and the lower surface 5120 of the first buffer member 510 comes into contact with the first step portion 151, the carrier 30 may be separated from the housing 10. That is, through this structure, when the downward movement of the carrier 30 in the optical axis direction exceeds the predetermined range, the lower surface 5120 of the first buffer member 510 comes into contact with the first step portion 151, and thus, impacts between the carrier 30 and the housing 10 due to the movement of the carrier 30 in the optical axis direction may be reduced.

A side surface of the first buffer member 510 may be disposed closer to the inner surface of the housing 10 than a side surface of the carrier 30. That is, when the carrier 30 unexpectedly moves in a direction, perpendicular to the optical axis, the side surface of the first buffer member 510 may first come into contact with the inner surface of the side wall 110 of the housing 10 before the side surface 310 of the carrier 30, and thus, impacts due to the movement of the carrier 30 may be reduced.

Referring to FIG. 12, the carrier 30 and the lens barrel 60 are disposed within the housing, and the frame 40 is inserted into the carrier 30. In addition, the second buffer member 520 is disposed on the second coupling portion 412 of the frame 40.

The upper surface 5210 of the second buffer member 520 may be disposed higher than the upper surface 31 of the carrier 30. That is, since the upper surface 5210 of the second buffer member 520 is disposed closer to the shield can 70 than the upper surface 31 of the carrier 30, when the upward movement of the carrier 30 in the optical axis direction exceeds the predetermined range, the upper surface 5210 of the second buffer member 520 may first come into contact with the shield can 70 before the upper surface 31 of the carrier 30, impacts caused by movement of the carrier 30 in the optical axis direction may be reduced.

The lower surface 5220 of the second buffer member 520 may be disposed to face the second step portion 152 of the housing 10. When the carrier 30 is lowered by the driving unit 20 and the lower surface 5220 of the second buffer member 520 comes into contact with the second step portion 152, the lower surface 5220 of the carrier 30 may be spaced apart from the housing 10. That is, through this structure, when the downward movement of the carrier 30 in the optical axis direction exceeds the predetermined range, the lower surface 5220 of the second buffer member 520 may first come into contact with the second step portion 152 first, and thus, impacts between the carrier 30 and the housing 10 due to the movement of the carrier 30 in the optical axis direction may be reduced.

The second side surface 522 of the second buffer member 520 may be disposed closer to the inner surface of the side wall 110 of the housing 10 than the side surface of the carrier 30. That is, when the carrier 30 unexpectedly moves in a direction, perpendicular to the optical axis, the second side surface 522 of the second buffer member 520 may first come into contact with the inner surface of the sidewall 110 of the housing 110 before the side surface of the carrier 30, and thus, impacts due to the movement of the carrier 30 may be reduced.

FIG. 13, FIG. 14, FIG. 15, FIG. 16 and FIG. 17 are diagrams illustrating examples of a structure in which a buffer member is disposed in an example camera module, in accordance with more embodiments.

Figure 13:
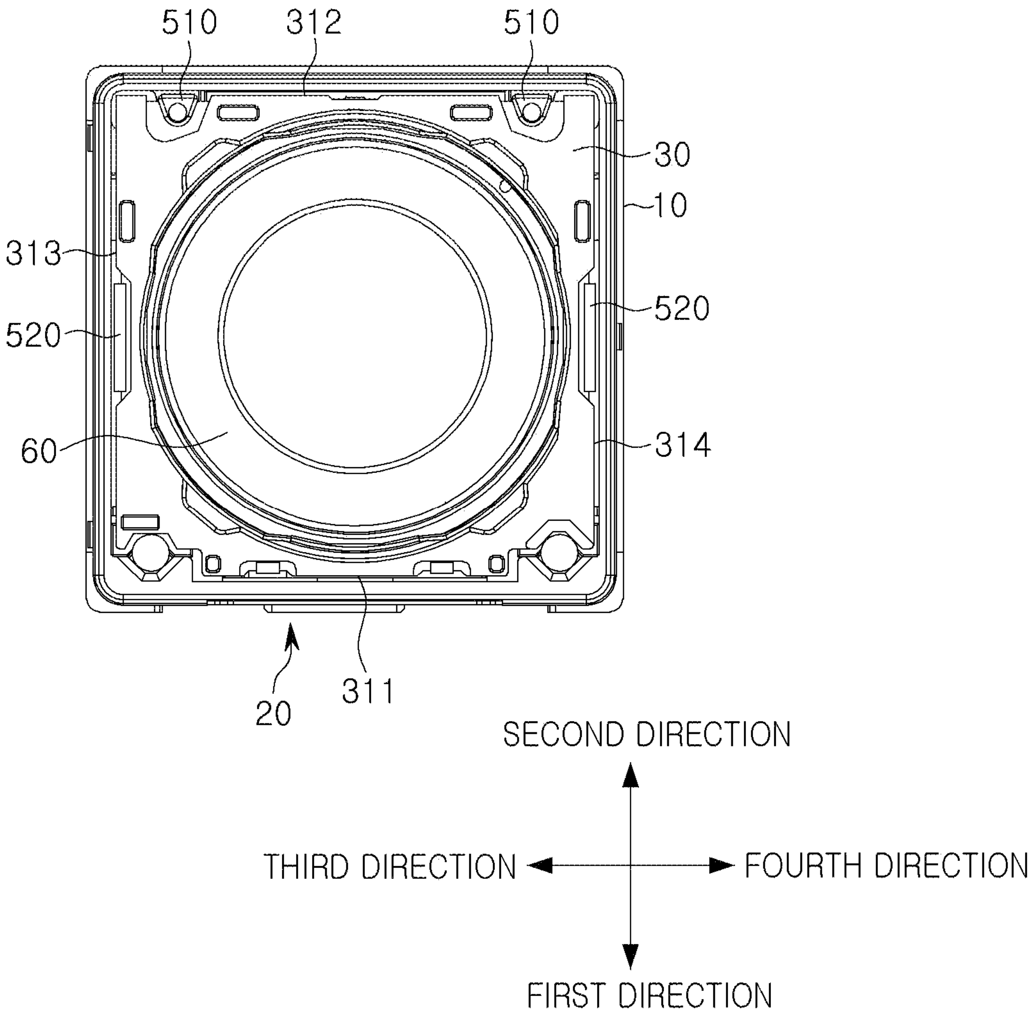
FIG. 13, FIG. 14, FIG. 15, FIG. 16, and FIG. 17 are diagrams illustrating examples of a structure in which a buffer member is disposed in an example camera module, in accordance with one or more embodiments.

Referring to FIG. 13, each of the first buffer member 510 and the second buffer member 520 may be arranged in plural. When the driving unit 20 is disposed on the first side 311 with respect to the side 310 of the carrier 30, the plurality of first buffer members 510 may be disposed to be adjacent to the second side 312, and the second buffer member 520 may be disposed on each of the third side 313 and the fourth side 314.

When external force acts on the camera module 1, the carrier 30 may move within the housing 10.

When the carrier 30 moves in a second direction within the housing 10, the first buffer member 510 may contact the housing 10 to reduce impacts. In addition, when the carrier 30 moves in the third or fourth direction within the housing 10, the second buffer member 520 may contact the housing 10 to reduce impacts.

Figure 14:
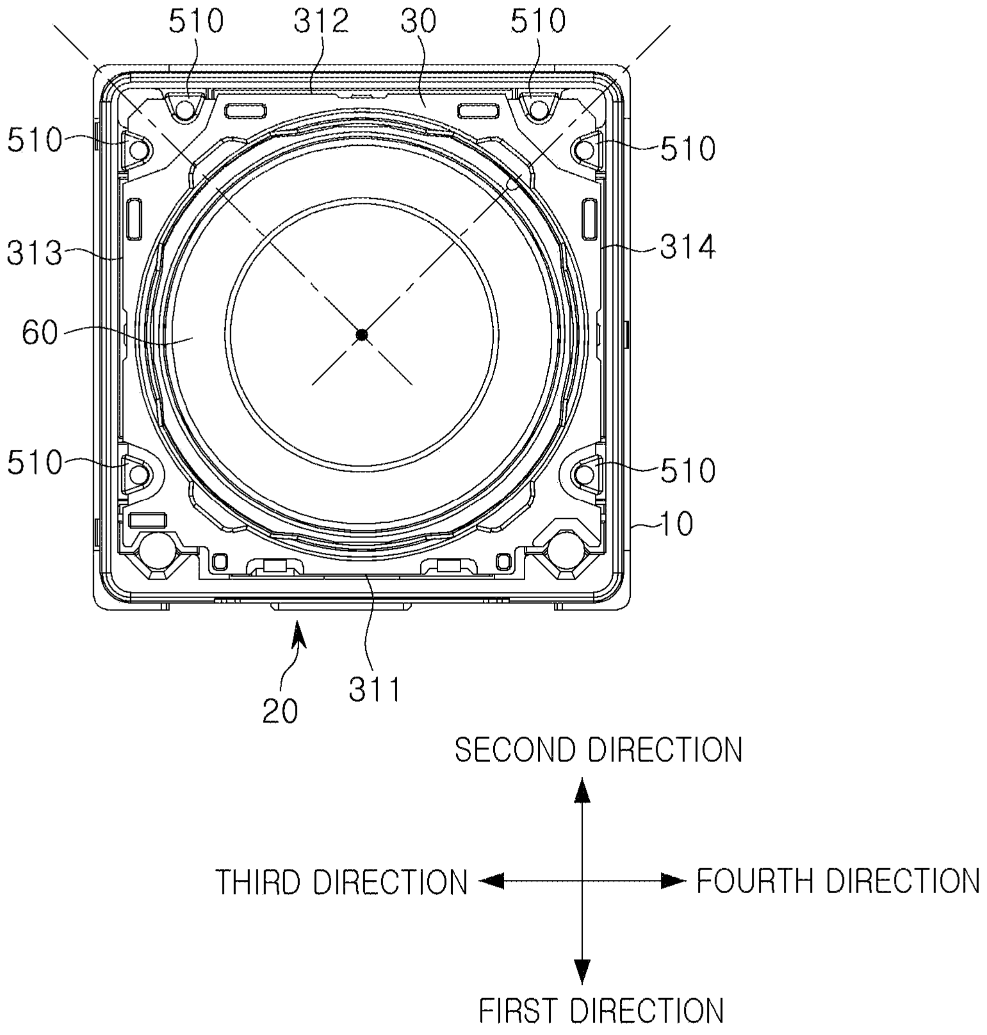

Referring to FIG. 14, the first buffer member 510 may be arranged in plural. When the driving unit 20 is disposed on the first side 311 with respect to the side 310 of the carrier 30, the first buffer member 510 may be disposed in a first corner region between the second side 312 and the third side 313. The first buffer member 510 may be disposed in a second corner region between the second side 312 and the fourth side 314. In addition, the first buffer member 510 may be disposed on the third side 313 and the fourth side 314. In this case, the first buffer member 510 may be disposed to be inclined toward the first side 311.

The plurality of first buffer members 510 disposed in each of the first corner region and the second corner region may be arranged on opposite sides with a virtual straight line connecting the edge of the housing 10 and the optical axis therebetween.

When external force acts on the camera module 1, the carrier 30 may move within the housing 10.

When the carrier 30 moves in the second direction within the housing 10, the first buffer member 510 disposed on the second side 312 may contact the housing 10 to reduce impacts. In addition, when the carrier 30 moves in the third or fourth direction within the housing 10, the first buffer member 510 disposed in the third or fourth direction may contact the housing 10 to reduce impacts.

Figure 15:
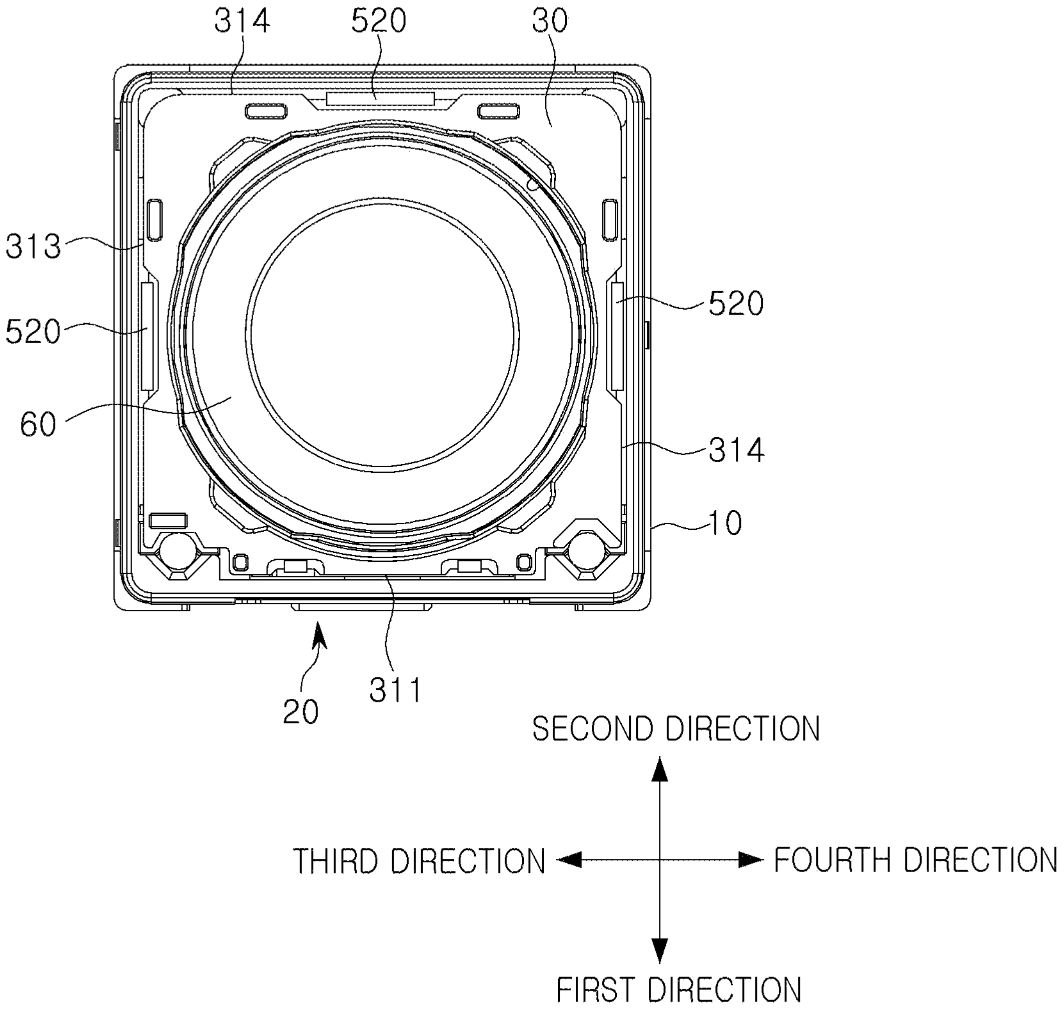

Referring to FIG. 15, the second buffer member may be disposed in plural. When the driving unit is disposed to be adjacent to the first side based on the side of the carrier, the second buffer member may be disposed on each of the second, third, and fourth sides.

When external force acts on the camera module 1, the carrier 30 may move within the housing 10.

When the carrier 30 moves in the second direction within the housing 10, the first buffer member 510 may contact the housing 10 to reduce impacts. In addition, when the carrier 30 moves in the third or fourth direction within the housing 10, the second buffer member 520 may contact the housing 10 to reduce impacts.

Figure 16:
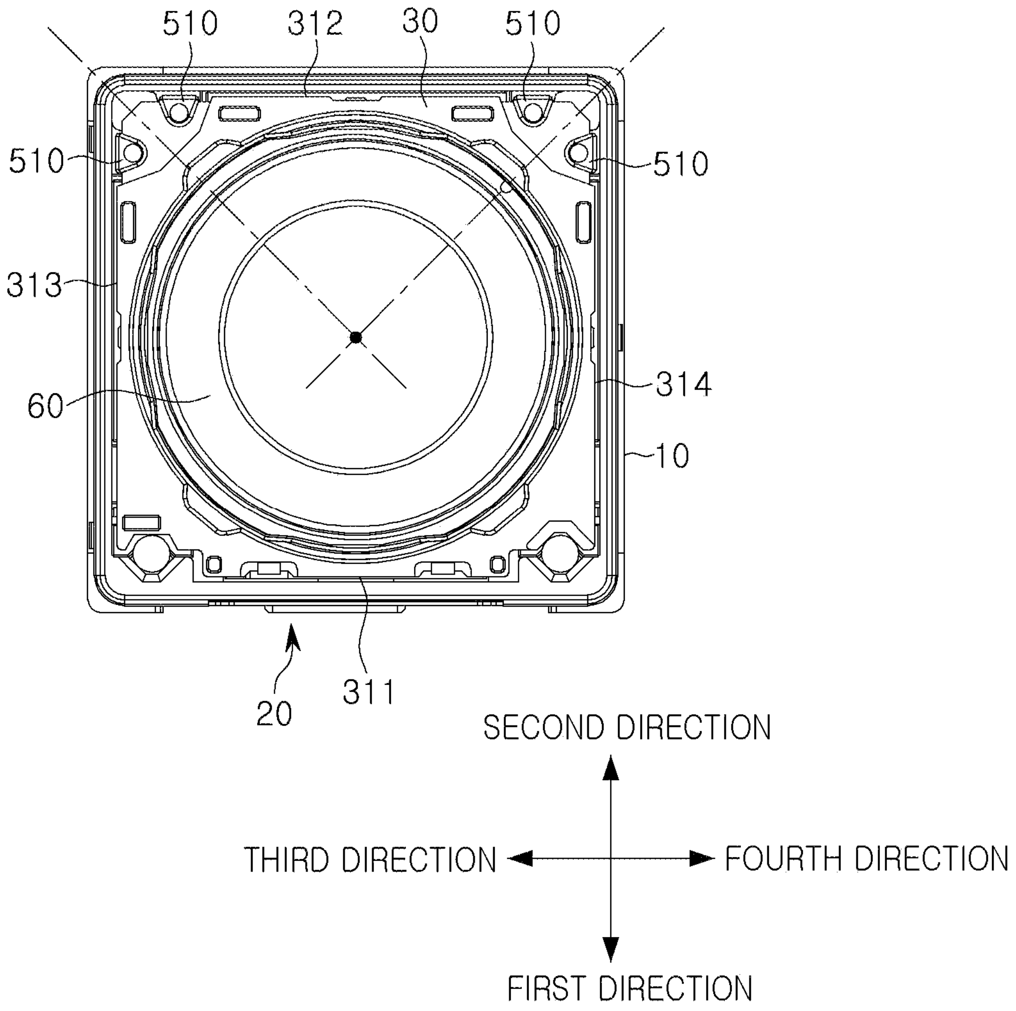

Referring to FIG. 16, the first buffer member 510 may be disposed in plural. When the driving unit 20 is disposed on the first side 311 based on the side of the carrier 30, the first buffer member 510 may be disposed in the first corner region between the second side 312 and the third side 313. Two first buffer members 510 may be disposed in the first corner region, one of which is disposed on the second side 312, and the other first buffer member 510 may be disposed on the third side 313.

The first buffer member 510 may be disposed in the second corner region formed by the second side 312 and the fourth side 314. Two first buffer members 510 may be disposed in the second corner region, one of which is disposed on the second side 312 and the other first buffer member 510 may be disposed on the fourth side 314.

When external force acts on the camera module 1, the carrier 30 may move within the housing 10.

When the carrier 30 moves in the second direction within the housing 10, impacts may be reduced by the first buffer member 510 disposed on the second side 312.

When relatively weak external force acts on the camera module 1 in the third or fourth direction, attractive force acts on the carrier 30 in the first direction by the driving unit 20, and thus, the carrier 30 may be tilted in the third or fourth direction based on the driving unit 20. In this case, impacts may be reduced by the first buffer member 510 disposed in the first corner region or the second corner region.

Figure 17:
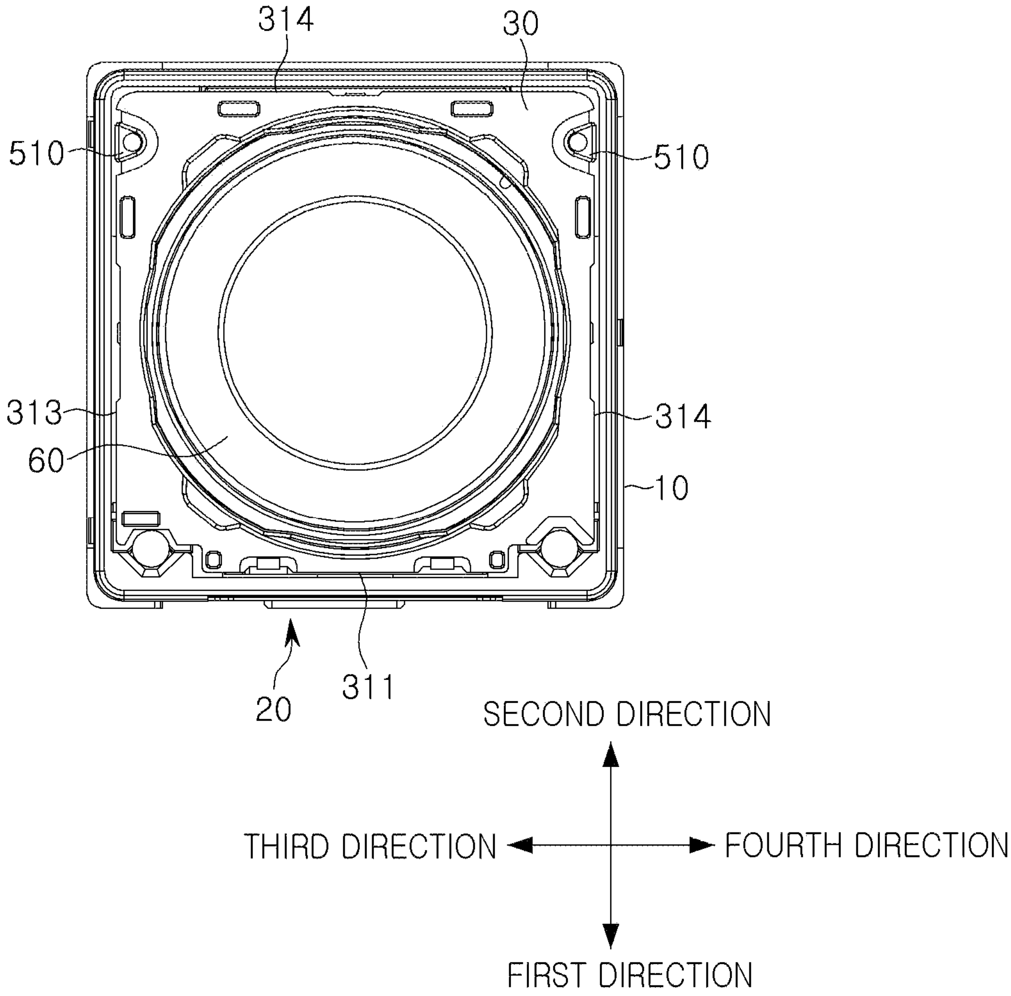

Referring to FIG. 17, the first buffer member 510 may be disposed in plural. When the driving unit 20 is disposed on the first side 311 with respect to the side of the carrier 30, the first buffer member 510 may be disposed on the third side 313 and the fourth side 314.

When relatively weak external force acts on the camera module 1 in the first or second direction, attractive force acts on the carrier 30 in the first direction by the driving unit 20, and thus, collision of the carrier 300 with the housing in the second direction may be prevented.

When relatively weak external force acts on the camera module 1 in the third or fourth direction, attractive force acts on the carrier 30 in the first direction by the driving unit 20, and thus, the carrier 30 may be tilted in the third or fourth direction based on the driving unit 30. In this case, impacts may be reduced by the first buffer member 510 disposed on the third side 313 or the fourth side 314.

The camera module 1 according to an exemplary embodiment in the present disclosure may reduce noise caused by the movement of the carrier 30 within the camera module 1. In addition, failure and damage to the camera module 1 caused by the carrier 30 of the camera module 1 colliding with another member may be reduced.

The disclosure is not limited to the example embodiments described above, and those of ordinary skill in the technical field to which the present disclosure pertains may make any changes without departing from the gist of the technical idea of the present disclosure as set forth in the claims below. It may be implemented with various changes. For example, various features described in the aforementioned example embodiments may be applied in combination to other exemplary embodiments unless explicitly stated to the contrary.

The one or more examples may reduce the noise caused by the movement of the carrier in the camera module.

In addition, the one or more examples may reduce a fault and damage of the camera module caused as the carrier of the camera module collides with other members.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
- a carrier configured to move in an optical axis direction;
- a frame at least partially disposed inside the carrier;
- a housing which accommodates the carrier; and
- a buffer member,
- wherein the frame comprises a coupling portion that is exposed to an external area of the carrier, and
- wherein the buffer member is directly coupled to the coupling portion such that the buffer member is spaced apart from the carrier, and a side of the buffer member is disposed to be closer to an internal surface of the housing than a side of the carrier.

2. The camera module of claim 1, wherein the carrier is configured to hold a lens barrel.

3. The camera module of claim 1, further comprising:
- a driving unit configured to move the carrier in the optical axis direction,
- wherein the driving unit is disposed on a first side of the carrier, and the buffer member is disposed opposite to the first side with respect to an optical axis.

4. The camera module of claim 3, wherein each of the coupling portion and the buffer member is arranged in plural.

5. The camera module of claim 4, wherein a first subset of the plurality of buffer members and a second subset of the plurality of buffer members are arranged on opposite sides of the frame with respect to an axis, perpendicular to the optical axis.

6. The camera module of claim 1, wherein:
- each of the coupling portion and the buffer member is arranged in plural,
- the carrier comprises a first side, a second side disposed to oppose the first side, a third side that connects the first side to the second side, and a fourth side that is disposed to oppose the third side, and
- the plurality of buffer members include buffer members that are arranged on the third side of the carrier and the fourth side of the carrier.

7. The camera module of claim 1, wherein:

the coupling portion includes a first coupling portion disposed on a first side of the frame and a second coupling portion disposed on a second side of the frame, the buffer member includes a first buffer member coupled to the first coupling portion and a second buffer member coupled to the second coupling portion, and the first side of the frame and the second side of the frame correspond to sides of the housing having an edge of the housing and a virtual straight line extending the optical axis therebetween.

8. The camera module of claim 1, further comprising:

a shield can configured to cover the housing, wherein an upper surface of the buffer member is disposed to be closer to the shield can than to an upper surface of the carrier.

9. The camera module of claim 1, wherein:

the housing comprises a step portion that protrudes from the internal surface of the housing toward an internal area of the housing, and a lower surface of the buffer member is disposed to face the step portion in the optical axis direction.

10. The camera module of claim 1, wherein:

the coupling portion comprises a coupling recess and a support portion, and the support portion is disposed outside of the coupling recess with respect to the optical axis.

11. The camera module of claim 10, wherein:

a first portion of the buffer member is disposed in the coupling recess, and a second portion of the buffer member surrounds the support portion.

12. The camera module of claim 10, wherein:

the support portion comprises a first support portion and a second support portion, and the first support portion and the second support portion face each other and are spaced apart from each other in opposite directions.

13. The camera module of claim 1, wherein the buffer member comprises a first buffer portion, a second buffer portion, and a connection portion disposed between the first buffer portion and the second buffer portion.

14. The camera module of claim 13, wherein the coupling portion comprises a coupling recess and a support portion, and the connection portion is fitted into the coupling recess.

15. The camera module of claim 14, wherein the support portion is disposed between the first buffer portion and the second buffer portion.

16. A camera module, comprising:

a housing;

a carrier disposed within the housing, and configured to move in an optical axis direction; and a frame coupled to an internal area of the carrier, wherein the carrier exposes a portion of the frame to an external area of the carrier, and a buffer member is directly coupled to the portion of the frame that is exposed to the external area of the carrier such that the buffer member is spaced apart from the carrier.

17. The camera module of claim 16, wherein the carrier is configured to move a lens barrel in the optical axis direction.

18. The camera module of claim 16, wherein a side of the buffer member faces an internal surface of the housing.

19. The camera module of claim 16, wherein a coupling portion of the frame to which the buffer member is coupled is disposed in the portion of the frame that is exposed to the external area of the carrier.

20. A camera module, comprising:

a carrier configured to move in an optical axis direction;

a frame at least partially disposed inside the carrier;

a housing which accommodates the carrier; and a buffer member, wherein the frame comprises a coupling portion that is exposed to an external area of the carrier, wherein the buffer member is configured to be coupled to the coupling portion, and a side of the buffer member is disposed to be closer to an internal surface of the housing than a side of the carrier, wherein the coupling portion comprises a coupling recess and a support portion, and wherein the support portion is disposed outside of the coupling recess with respect to the optical axis.

* * * * *